(12) United States Patent
Nottingham

(10) Patent No.: US 8,677,687 B2
(45) Date of Patent: Mar. 25, 2014

(54) METHOD OF PRODUCING AN AGRICULTURAL POLYMER PROTECTED ROOT BALL

(71) Applicant: George Pierce Nottingham, Boynton Beach, FL (US)

(72) Inventor: George Pierce Nottingham, Boynton Beach, FL (US)

( * ) Notice: Subject to any disclaimer, the term of this patent is extended or adjusted under 35 U.S.C. 154(b) by 0 days.

(21) Appl. No.: 14/050,243

(22) Filed: Oct. 9, 2013

(65) Prior Publication Data

US 2014/0037834 A1    Feb. 6, 2014

Related U.S. Application Data

(62) Division of application No. 11/684,236, filed on Mar. 9, 2007, now Pat. No. 8,595,974.

(60) Provisional application No. 60/861,329, filed on Nov. 28, 2006.

(51) Int. Cl.
*A01G 23/04* (2006.01)
*A01G 13/00* (2006.01)
*B65D 85/52* (2006.01)

(52) U.S. Cl.
CPC ............ *A01G 23/04* (2013.01); *A01G 13/0237* (2013.01); *B65D 85/52* (2013.01)
USPC ....................................... 47/76; 47/74; 47/32

(58) Field of Classification Search
None
See application file for complete search history.

(56) References Cited

U.S. PATENT DOCUMENTS

| | | | |
|---|---|---|---|
| 3,316,675 A | | 5/1967 | Cartright, Jr. |
| 3,812,619 A | | 5/1974 | Wood et al. |
| 4,035,951 A | | 7/1977 | Dedolph |
| 4,241,537 A | | 12/1980 | Wood |
| RE32,476 E | | 8/1987 | Kistner |
| 4,797,145 A | | 1/1989 | Wallace et al. |
| 5,076,008 A | * | 12/1991 | Arroyo ............................ 47/31 |
| 5,311,700 A | | 5/1994 | Thomas |
| 5,344,471 A | | 9/1994 | Tusé et al. |
| 5,659,998 A | * | 8/1997 | Salestrom .................. 47/58.1 R |
| 5,866,269 A | * | 2/1999 | Dalebroux et al. ........ 428/537.5 |
| 5,996,278 A | | 12/1999 | Takaya et al. |
| 6,218,321 B1 | | 4/2001 | Lorcks et al. |
| 6,627,132 B1 | * | 9/2003 | Crawford et al. ............. 264/134 |
| 2002/0197295 A1 | | 12/2002 | Stein et al. |
| 2003/0019153 A1 | | 1/2003 | Tonkin et al. |
| 2003/0145518 A1 | | 8/2003 | Noda et al. |
| 2004/0133176 A1 | | 7/2004 | Muthiah et al. |
| 2005/0108938 A1 | | 5/2005 | Bakula et al. |
| 2006/0235360 A1 | | 10/2006 | Ahlers et al. |

* cited by examiner

*Primary Examiner* — Son T Nguyen
(74) *Attorney, Agent, or Firm* — Christie, Parker & Hale, LLP

(57) ABSTRACT

A root ball including soil disposed in and around root system and a layer of agricultural polymer around the soil and root system. The agricultural polymer creates a root ball having a semi-permeable, solid outer layer, which provides protection for the root system and eliminates the need for a container.

4 Claims, 4 Drawing Sheets

METHOD OF PRODUCING AN AGRICULTURAL POLYMER PROTECTED ROOT BALL

CROSS-REFERENCE TO RELATED APPLICATION(S)

This Application is a divisional application of U.S. patent application Ser. No. 11/684,236 filed Mar. 9, 2007, which claims priority to U.S. Provisional Application No. 60/861,329 filed Nov. 28, 2006, the entire contents of which are hereby incorporated by reference.

FIELD OF INVENTION

The present invention relates to plant root balls and more specifically to an agricultural polymer protected root ball.

BACKGROUND

When a plant, such as a tree, a bush or a shrub, is harvested for transplanting or transplanted from one place to another, it is advisable to leave a certain amount of soil around a root system of the plant. This network of roots and the soil clinging to the roots is known as a root ball, no matter the size or shape, or whether on a plant grown in a field or in a container. This root ball is necessary to provide protection, moisture and nutrients to the roots.

The root ball should be protected when transporting a plant to a local distributor or end user. Many growers protect the root ball by either having the root ball in a plant container or wrapping the root ball with burlap and wire.

A plant may be transplanted into a container for transporting or it may be grown in the container. Plant containers come in various sizes to accommodate the root balls of various size plants. The root ball plus the amount of soil necessary to fill these containers around the root ball often makes the containers heavy. For example, a semi-mature Queen Palm tree, approximately 60 inches high, in a fifteen gallon container, may weigh around 80 pounds. This excessive weight makes the plant difficult to move and transport, raising the risk of injury for those transporting and handling the plant, particularly if a container must be removed prior to planting.

Further still, soil in a plant container can be messy. The soil may spill from the container during shipping and handling, often due to vibration that occurs during loading and transit of the plant. This may cause damage to the roots of the plant and/or spillage of soil from the top of the container. Also, if enough soil spills from the container, the plant itself may shift in the container, causing damage to the roots. Spilled soil may also cause a mess in the shipping vehicle, leading to safety concerns and cleanup costs. If the plant is being transplanted indoors, for example, into a hotel or mall, any spilled soil may damage floors or carpets. Also, damage often occurs to the roots of the plant when removing the root ball from the container, as well as when moving the root ball to its final location after removal from the container.

For plants not transported in a container, burlap wrapping and wire maintain the soil around the root ball. However, these provide minimal protection for the root system. For example, the burlap wrapping provides no protection if the plant is dropped. Also, like with plants in containers, damage often occurs to the roots of the plant when removing the burlap and wire from around the root ball before planting, as well as when moving the root ball to its final location.

SUMMARY

The present invention provides an agricultural polymer protected root ball and methods of applying an agricultural polymer to a root ball, to provide a light, stable coating around the root ball which nurtures and protects the roots of a plant.

In general, in one aspect, the invention features a root ball, and methods for making the root ball, having soil disposed about a root system and a coating of agricultural polymer disposed at least partially around the soil and root system.

In embodiments, the coating of agricultural polymer is disposed about the soil and root system by placing the root system into a vat filled with a mixture of agricultural polymer and water. The root system is then removed from the vat and the agricultural polymer is dried.

In various embodiments, the vat is a hole in the ground lined with plastic. In other embodiments, the vat is a container. The container may be recessed into the ground. In certain embodiments, the vat is configured to enable the entire root ball to be wet by the agricultural polymer.

In embodiments, the agricultural polymer may be thermal polyaspartate, polyelectrolytes, polysaccharides or a combination thereof. The agricultural polymer may also be a mixture of agricultural polymer and water.

In general, in another aspect, the invention features a method of producing an agricultural polymer protected root ball including spraying a root ball with an agricultural polymer to form a coating about the root ball and then drying the agricultural polymer coating.

The invention can be implemented to realize one or more of the following advantages. An agricultural polymer produces a root ball that includes a semi-permeable, solid protective layer, leading to a more stable and robust root ball for transporting, handling and shipment.

The agricultural polymer enables transport of the plant without a container. For example, the grower may remove the root ball from the container and coat the root ball with an agricultural polymer to provide protection for the root system. The agricultural polymer enables water and nutrients to pass and enter the root ball, while maintaining the integrity of the root ball, and will biodegrade over time.

Damage to the root system caused by normal handling and vibrations of transporting a plant are minimized or eliminated. The lack of a container also makes the plant easier to handle and move, particularly for an end user, such as a typical homeowner, who is attempting to handle and transplant the plant.

Coating the root ball with an agricultural polymer enables the grower to reuse the containers, thereby resulting in cost savings as well as less waste in the form of discarded containers. This also enables easier installation by the end-user because the end-user simply places the plant in its final location. Further, because of the solid nature of the agricultural polymer, the root ball may be rolled on the ground without damaging the plant roots.

The agricultural polymer enables the transport of the plant laid on its side, such as in a vehicle, without soil coming out of a container and making a mess of the vehicle. Further, an end-user does not have to remove the plant from a container, which could be difficult and cause damage to the root system, and the agricultural polymer coating protects the roots while the plant is being handled and transplanted.

Other features and advantages of the invention are apparent from the following description, and from the claims.

BRIEF DESCRIPTION OF THE DRAWINGS

Like reference numbers and designations in the various drawings indicate like elements.

DETAILED DESCRIPTION

Figure 1:
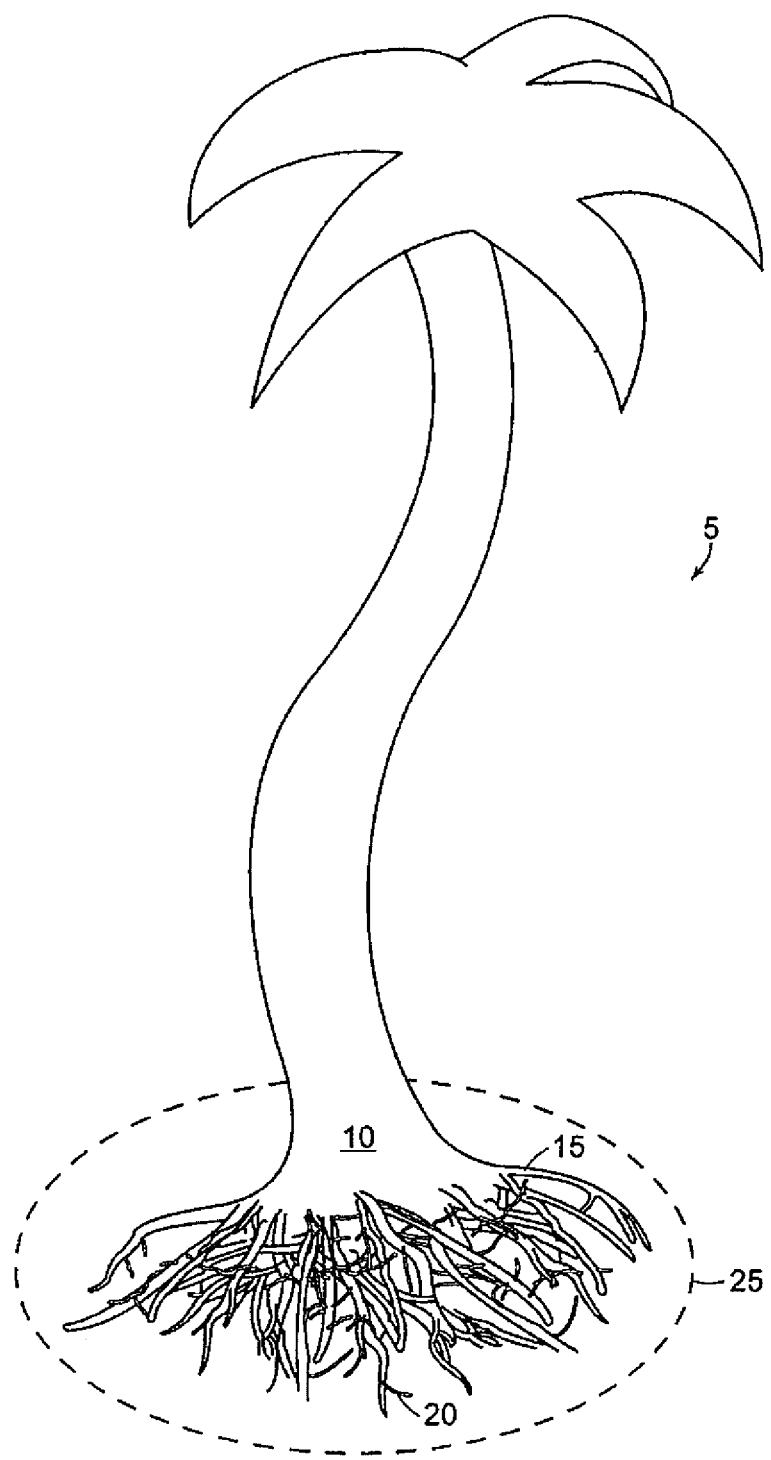
FIG. 1 is a front view of an exemplary tree and its root system encapsulated in a root ball.

As shown in FIG. 1, a tree 5 includes a root system 10 having larger roots 15 and finer roots 20. The finer roots 20 are important to help establish the tree when replanted because these finer roots 20 grow faster and gather more water and nutrients than the larger roots 15. The larger roots' 15 primary purpose is to provide support and anchorage for the tree 5, although they also gather water and nutrients for the tree 5. As can be seen, the root system 10 is a complex mass of larger roots 15 and finer roots 20.

When a tree 5 is removed from the ground or a container in which the tree 5 has been grown to be transplanted or sold, the roots 15, 20 are generally left in a root ball 25 composed of soil from where the tree 5 was taken. Even if a root ball 25 is not maintained, soil will be trapped throughout the root system 10, unless the root system 10 is washed.

Figure 2:
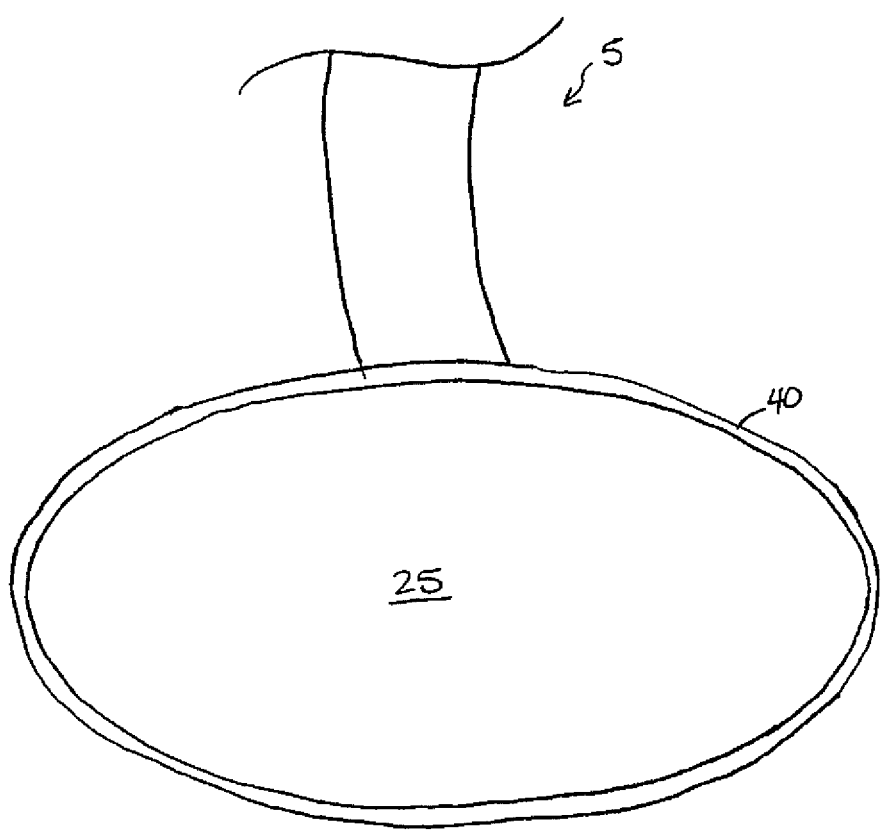
FIG. 2 is a front view of the tree of FIG. 1 with an agricultural polymer coating encapsulating the root ball according to one embodiment of the invention.

Referring to FIG. 2, after the root ball 25 of the tree 5 is removed from the ground or container, a solution containing agricultural polymer and water is applied to the root ball 25. The agricultural polymer, such as thermal polyaspartate or a combination of polyelectrolytes and polysaccharides, creates a semi-permeable agricultural polymer protective shell 40 that, once dry, hardens into a biodegradable plastic-like layer. Thereafter, the tree 5 may be transplanted with the agricultural polymer protective shell 40 retained on the root ball 25. The agricultural polymer protective shell 40 biodegrades over a period of time, while enabling water and nutrients to reach the root system.

Figure 3:
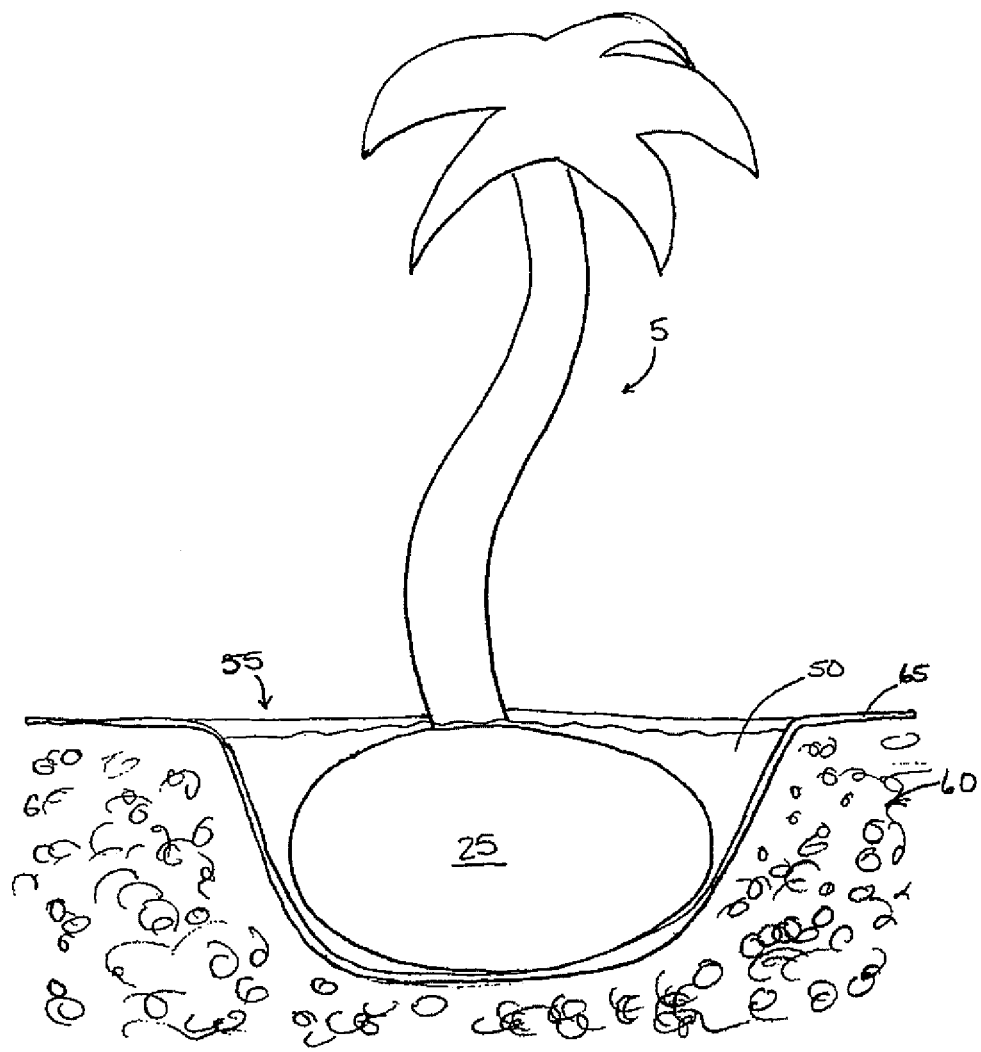
FIG. 3 is a cut-away view of an exemplary vat used to apply the agricultural polymer.

The agricultural polymer may be applied by any suitable method. For example, referring to FIG. 3, one (1) to one and three-quarters (1¾) cup of agricultural polymer, such as E-Tack Soil Control Agent (available from Finn Corporation of Fairfield, Ohio), may be mixed with 5-gallons of water to be applied to the root ball 25. The agricultural polymer and water solution 50 may be placed in a vat 55 into which the root ball 25 may be dipped. As shown in this example, the vat 55 is a hole dug in the ground 60 and lined with plastic 65. Recessing the vat 55 into the ground enables easier handling of the tree 5 and reduces the likelihood that the root ball 25 will be damaged. The vat 55 is sized to enable the entire root ball 25 to be dipped into the vat 55 such that the agricultural polymer and water solution 50 wet the entire root ball 25. The root ball 25 is left in the agricultural polymer and water solution 50 for approximately one (1) minute. The root ball 25 is removed from the agricultural polymer and water solution 50 and dried. The root ball 25 may then again be dipped into the agricultural polymer and water solution 50 to increase the thickness of the agricultural polymer protective shell 40. However, the thickness of the agricultural polymer protective shell 40 need not be uniform.

Figure 4:
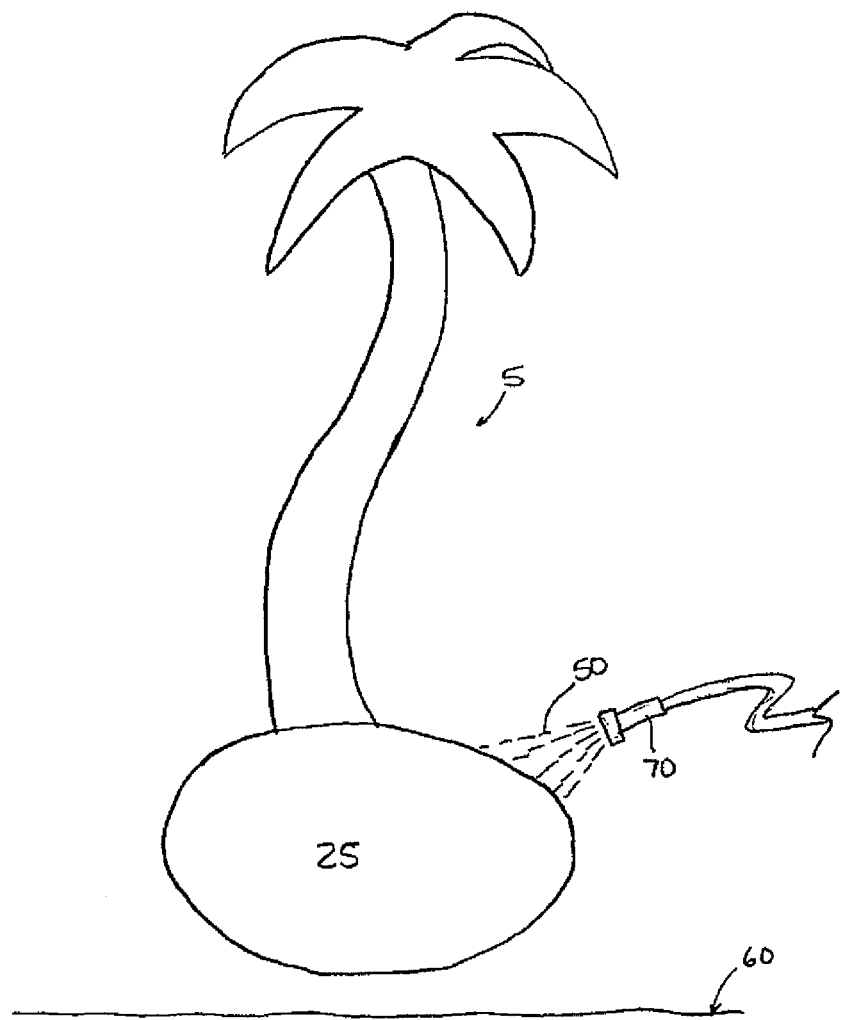
FIG. 4 is a front view of an exemplary sprayer to apply the agricultural polymer.

Referring to FIG. 4, in another exemplary embodiment, the agricultural polymer and water solution 50 is sprayed onto the root ball 25. The tree 5 may be suspended with the root ball 25 off the ground 60. A sprayer 70 is used to apply the agricultural polymer and water solution 50 onto the entire root ball 25 and permitted to dry. Multiple coats of the agricultural polymer and water solution 50 may be applied to achieve the desired thickness of the agricultural polymer protective shell 40. Again, the thickness of the agricultural polymer protective shell 40 need not be uniform.

The root ball 25 with the agricultural polymer protective shell 40 may be further wrapped with an ultraviolet (UV) protective plastic wrap before sale and/or transport of the plant. The end user would only need to remove the UV protective plastic wrap before transplanting the plant with the root ball 25 and agricultural polymer protective shell 40 directly into the ground.

It is to be understood that the foregoing description is intended to illustrate and not to limit the scope of the invention, which is defined by the scope of the appended claims. Other embodiments are within the scope of the following claims. For example, while a tree has been described, the methods described can be used equally well on bushes and other plants. Also, while specific brand name products have been described, these specific products are not necessary to practice the methods described.

Further, while certain steps have been described, more or less steps may be used. For example, the root system may be cleaned of all soil to produce a plant with a clean root system (e.g., no contaminates or spores, such as foreign insects, microbes, bacteria and fungi) for shipment to areas of the United States or the world that prohibit foreign soil (i.e., soil from outside that area), and then repacked with clean soil before applying the agricultural polymer. The clean soil may include peat moss, sawdust or a combination thereof.

Also, while a certain mixture of agricultural polymer and water has been described, other mixture ratios may be necessary with other root balls having different soil conditions. Further, while the vat 55 has been shown as a hole dug into the ground and lined with plastic, the vat 55 may be a tub, a barrel or any other container into which the root ball 25 may be dipped.

What is claimed is:

1. A method of producing a root ball comprising the steps of:
   removing a root system and soil disposed about the root system from its place of growth;
   applying to the root system and soil disposed about the root system removed from its place of growth a coating of an aqueous mixture of agricultural polymer and water, the agricultural polymer being a thermal polyaspartate or a combination of polyelectrolytes and polysaccharides; and
   drying the coating to provide a biodegradable protective layer to the root ball.

2. The method of claim 1 wherein the step of applying includes dipping the root system and soil disposed about the root system into a vat of the aqueous mixture.

3. The method of claim 1 wherein the step of applying includes spraying the root system and soil disposed about the root system with the aqueous mixture.

4. The method of claim 1 further comprising the step of placing an ultraviolet plastic wrap around the root ball.

\* \* \* \* \*